3,158,825
MOVABLE RESONANT CAVITY TUNING PROBE IN DIELECTRIC SLEEVE HAVING NONUNIFORM OUTER SURFACE
Maurice J. Vetter, Boulder, Colo., assignor to the United States of America as represented by the Secretary of Commerce
Filed May 10, 1962, Ser. No. 193,887
2 Claims. (Cl. 333—83)

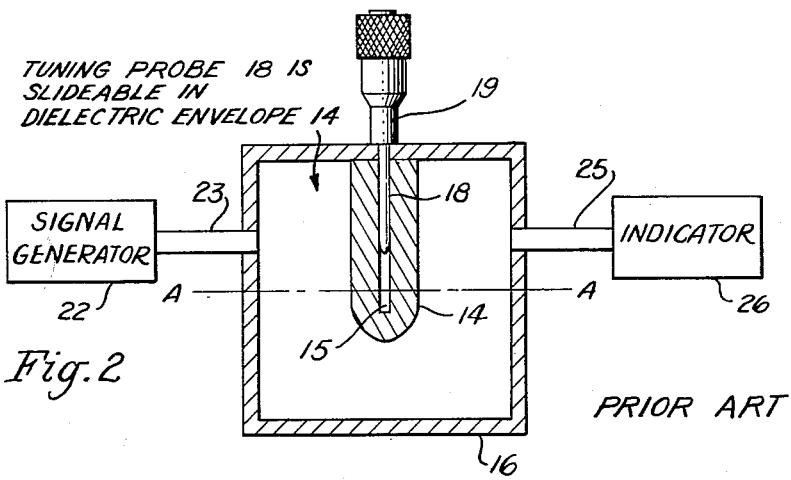
Fig. 2 — PRIOR ART
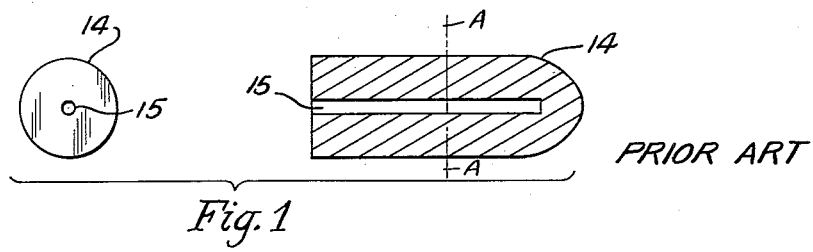
Fig. 1 — PRIOR ART
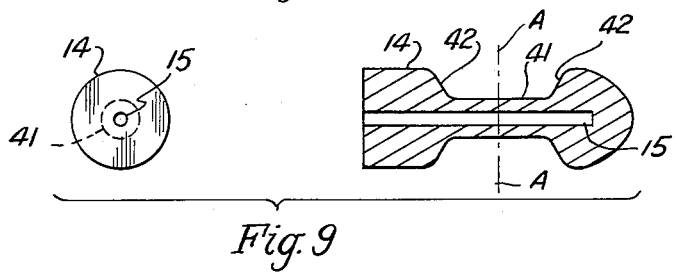
Fig. 9
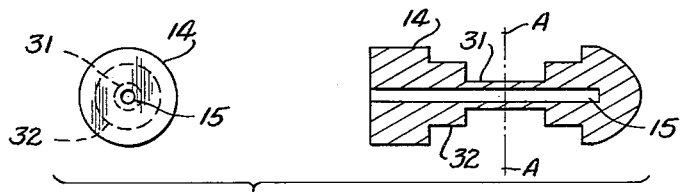
Fig. 3
INVENTOR
Maurice J. Vetter
BY David Robbins
ATTORNEY INVENTOR
Maurice J. Vetter
BY
David Gobbins
ATTORNEY United States Patent Office 3,158,825
Patented Nov. 24, 1964

This invention relates to a tuning device for a resonant cavity.

In conventional tuning devices, a probe is inserted into a cavity to adjust its resonant frequency. As the probe is inserted, a resonant frequency-probe insertion characteristic is obtained that is linear around a small distance near the physical center of the cavity.

An object of the present invention is to provide a resonant cavity with a desired linear or nonlinear resonant frequency-probe insertion characteristic.

Another object is to provide a resonant cavity with a substantially linear resonant frequency-probe insertion characteristic over an extended range.

These and other objects are accomplished by positioning the probe in an envelope composed of material having a selected dielectric constant and then shaping the envelope to obtain a desired relationship between the probe insertion and the resonant frequency of the cavity.

In the figures:

FIG. 1 is a probe envelope, prior to being formed in accordance with the present invention;

FIG. 2 discloses test equipment used in practicing this invention;

FIG. 3 is a probe envelope formed in accordance with this invention;

FIG. 9 is a second probe envelope formed in accordance with the present invention.

Figure 4:
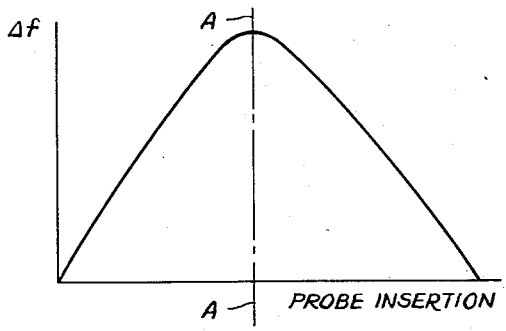
FIGS. 4 to 8 are $\Delta f$-probe insertion and frequency-probe insertion characteristics used in explaining this invention.

Referring to the figures, FIG. 1 discloses the shape of dielectric envelope 14 before it is formed in accordance with the techniques of the present invention. The envelope is composed of a material having a dielectric constant different, and preferably greater, than the medium in which it operates. When the medium is air, the envelope may be composed of quartz, which has low losses, a low temperature coefficient and a suitable dielectric constant greater than one. The envelope includes bore 15, having the proper dimensions to receive a suitable probe. Line A—A represents a plane that would pass through the physical center of cavity 16 if the envelope were positioned in the cavity.

In FIG. 2, envelope 14 is located in resonant cavity 16 and is positioned to receive tuning probe 18, which may be accurately adjusted by means of micrometer 19. Signal generator 22 applies energy to the resonant cavity through waveguide 23, and the energy in the cavity is sampled by indicator 26 through waveguide 25. Line A—A represents a plane through the physical center of cavity 16.

In determining the resonant frequency of the cavity for a particular insertion of probe 18, the output of signal generator 22 is varied until a maximum reading is obtained on indicator 26. The setting of the generator providing this reading corresponds to the resonant frequency of the cavity.

In providing resonant cavity 16 with a linear resonant frequency-probe insertion characteristic over an extended range, probe 18 is inserted selected distances into envelope 14 and the resonant frequency of cavity 16 is measured for each distance of probe insertion. The characteristic curve of resonant frequency vs. probe insertion that is obtained is then studied and the envelope is formed, preferably at the most sensitive point of probe insertion, which is normally located at the physical center of the cavity. The probe is again inserted the selected distances into envelope 14, and another resonant frequency vs. probe insertion characteristic is plotted to determine the affect the envelope-forming had on this characteristic. These steps are repeated until a desired characteristic curve is obtained.

Figure 5:
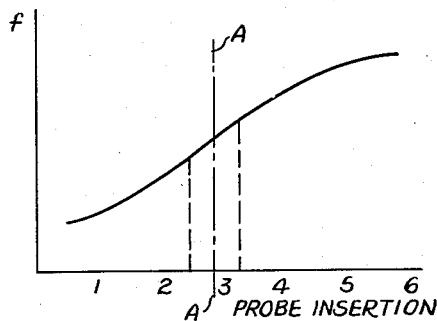

As an example of the results obtained by this method, when envelope 14 has the shape shown in FIG. 1, cavity 16 has the $\Delta$ resonant frequency vs. probe insertion characteristic shown in FIG. 4 and the resonant frequency vs. probe insertion characteristic shown in FIG. 5. It is noted that the characteristic in FIG. 5 is linear over the range between units 2.5 to 3.5 of probe insertion, around the physical center of the cavity, the latter being represented by line A—A.

Figure 6:
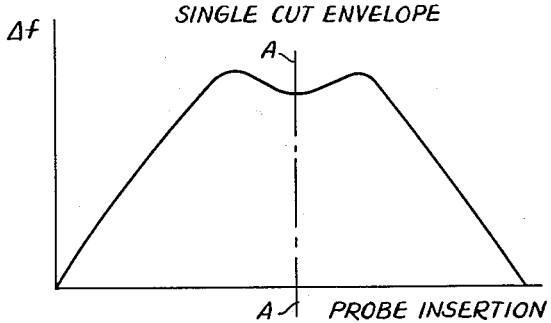
Figure 7:
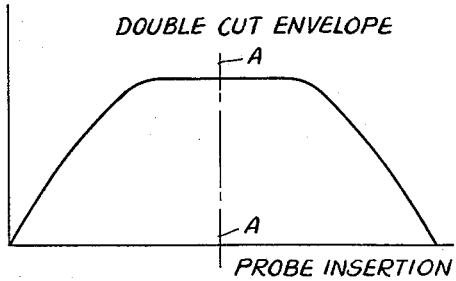
Figure 8:
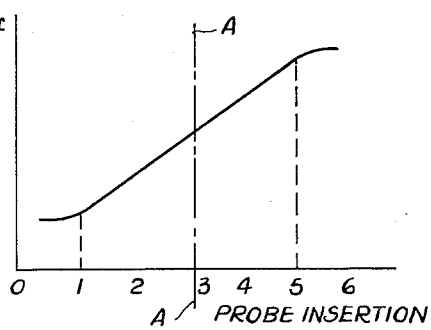

When envelope 14 is provided with surface 31, as shown in FIG. 3, cavity 16 has the $\Delta$ resonant frequency vs. probe insertion characteristic shown in FIG. 6. When the envelope is provided with surface 32, the cavity has the $\Delta$ resonant frequency vs. probe insertion characteristic shown in FIG. 7 and a resonant frequency-probe insertion characteristic represented by the curve in FIG. 8. It is noted that the characteristic in FIG. 8 is now linear between units 1 to 5, around the physical center of the cavity. The latter is represented by line A—A in FIGS. 6 to 8. For comparison purposes, the same frequency scale and probe insertion units are used in FIGS. 5 and 8.

The method described immediately above may be employed to develop surfaces 41 and 42 (FIG. 9) on envelope 14 which then may be used in resonant cavity 16 to provide the cavity with a linear resonant frequency vs. probe insertion characteristic similar to the one in FIG. 8.

It will be apparent to those skilled in the art that envelope 14 may have any one or more of a variety of shapes, such as rectangular, triangular or eliptical and that the envelope may be formed with inner or outer surfaces having other shapes than those disclosed. It will also be apparent that the method taught by the present invention could be used to obtain a tuning device having a nonlinear resonant frequency-probe insertion characteristic. Again, the teachings of the present invention could be used to calculate the shape of the envelope 14 required to provide the cavity 16 with a desired resonant frequency probe-insertion characteristic. Thus, within the scope of the appended claims, the invention may be practiced otherwise than as specifically described.

What is claimed is:

1. A tuning device for a resonant cavity comprising: an envelope of selected dielectric material positioned in said cavity, said envelope having a plurality of surfaces, each defined by a respective line drawn substantially parallel to and rotated around the longitudinal axis of said envelope, a probe, and means for selectively positioning said probe in said envelope.

2. In the combination of a resonant cavity, a sleeve of selected dielectric material having a longitudinal axis, said sleeve being positioned in said cavity, a movable conductive probe positioned in said sleeve, means for moving said probe in said sleeve a variable amount to control the resonant frequency of said cavity in dependency upon the insertion of said probe into the sleeve, whereby said cavity is provided with a resonant frequency probe-insertion characteristic that is linear over a predetermined frequency range, the improvement wherein: the outer surface of said sleeve is nonuniform along the longitudinal axis of said sleeve, said nonuniformity being such that the resonant frequency probe-insertion characteristic of said cavity is linear over a frequency range that is greater than said predetermined frequency range.

References Cited by the Examiner
UNITED STATES PATENTS

| 2,411,858 | 12/46 | Harvey | 334—81 |
| 2,445,811 | 7/48 | Varian | 315—5 |

FOREIGN PATENTS 128,063  8/59  Russia.

HERMAN KARL SAALBACH, *Primary Examiner.*